(12) United States Patent
Davis

(10) Patent No.: US 6,522,176 B1
(45) Date of Patent: Feb. 18, 2003

(54) LOW SPURIOUS DIRECT DIGITAL SYNTHESIZER

(75) Inventor: Brian M. Davis, Hudson, NH (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/998,836

(22) Filed: Nov. 15, 2001

(51) Int. Cl.[7] .............................................. H03B 21/00
(52) U.S. Cl. ........................ 327/105; 327/107; 327/551
(58) Field of Search ................................. 327/105, 106, 327/107, 113, 291, 310, 311, 551; 708/271; 341/147, 144

(56) References Cited

U.S. PATENT DOCUMENTS

| | | | |
|---|---|---|---|
| 4,410,954 A | 10/1983 | Wheatley, III | 708/101 |
| 4,652,832 A | 3/1987 | Jasper | 327/106 |
| 4,901,265 A | 2/1990 | Kerr et al. | 708/276 |
| 4,905,177 A | 2/1990 | Weaver, Jr. et al. | 708/276 |
| 4,972,188 A | 11/1990 | Clement et al. | 311/118 |
| 4,994,803 A | 2/1991 | Blackham | 341/131 |
| 5,010,506 A * | 4/1991 | Hrncirik | 708/276 |
| 5,014,231 A | 5/1991 | Reinhardt et al. | 708/271 |
| 5,148,163 A | 9/1992 | Frindle | 341/131 |
| 5,291,428 A | 3/1994 | Twitchell et al. | 708/3 |
| 5,459,680 A | 10/1995 | Zimmerman et al. | 708/276 |
| 5,495,202 A | 2/1996 | Hsu | 327/113 |
| 5,521,533 A * | 5/1996 | Swanke | 327/107 |
| 5,554,987 A * | 9/1996 | Ooga | 341/147 |
| 5,563,535 A * | 10/1996 | Corry et al. | 327/105 |
| 5,757,239 A | 5/1998 | Gilmore | 331/18 |
| 5,789,950 A * | 8/1998 | Nakagawa | 327/105 |
| 5,880,689 A | 3/1999 | Kushner | 341/144 |
| 5,963,157 A | 10/1999 | Smith | 341/131 |
| 6,005,419 A * | 12/1999 | Rudish | 327/107 |
| 6,060,917 A * | 5/2000 | Saul | 327/107 |

OTHER PUBLICATIONS

J. Tierney, C. Rader & B. Gold, "A Digital Frequency Synthesizer", Mar., 1971.
R. Andraka, "A survey of CORDIC algorithms for FPGA based computers", 1998.
S. Mehrgardt, "Noise Spectra of Digital Sine–Generators Using the Table–Lookup Method" Aug., 1983.
H. Nicholas, III & H. Samueli, "An Analysis of the Output Spectrum of Direct Digital Frequency Synthesizers in the Presence of Phase–Accumulator Truncation", 1987.
V. F. Kroupa, "Close to the carrier noise in DDS,", 1996, pp. 934–941.
Zs. Papay, "Numerical Distortion in Single–Tone DDS", May, 2001.
L. Schuchman, "Dither Signals and Their Effect on Quantization Noise", 1964.

(List continued on next page.)

Primary Examiner—Kenneth B. Wells
Assistant Examiner—Hai L. Nguyen
(74) Attorney, Agent, or Firm—Cantor Colburn LLP

(57) ABSTRACT

A direct digital synthesizer for generating an output signal within a frequency band. The direct digital synthesizer comprises an input section for receiving a phase differential value and generating a phase angle value. A phase-amplitude converter generates an amplitude value in response to the phase angle value. A band-shaped dither generator generates a dither value. A first combiner sums the amplitude value and the dither value to define a first combined value. A second combiner differences the amplitude value and the dither value to define a second combined value. A first digital-to-analog converter (DAC) converts the first combined value to a first analog signal. A second digital-to-analog converter (DAC) converts the second combined value to a second analog signal. An output combiner combines the first analog signal and the second analog signal to generate the output signal.

22 Claims, 9 Drawing Sheets

OTHER PUBLICATIONS

V. S. Reinhardt, "Spur Reduction Techniques in Direct Digital Synthesizers", 1993, pp. 230–241.

J. Vankka, "Spur Reduction Techniques in Sine Output Direct Digital Synthesis", 1996, pp. 951–959.

J. E. Volder, "The CORDIC Trigonometric Computing Technique", 1959, pp. 330–334.

H. T. Nicholas, III & H. Samueli, A 150 MHz Direct Digital Frequency Synthesizer in 1.25–$\mu$m CMOS with —90–dBc Spurious Performance, Dec., 1991, pp. 1959–1969.

B. A. Blesser & B. N. Locanthi, "The Application of Narrow–Band Dither Operating at the Nyquist Frequency in Digital Systems to Provide Improved Signal–to–Noise Ratio over Conventional Dithering", 1987, pp. 446–454.

* cited by examiner

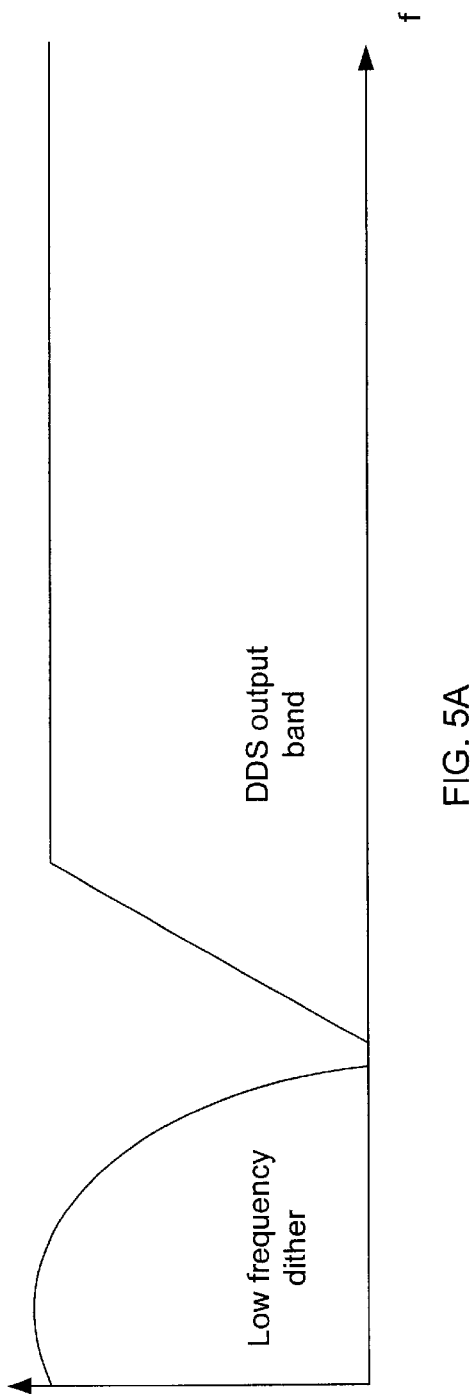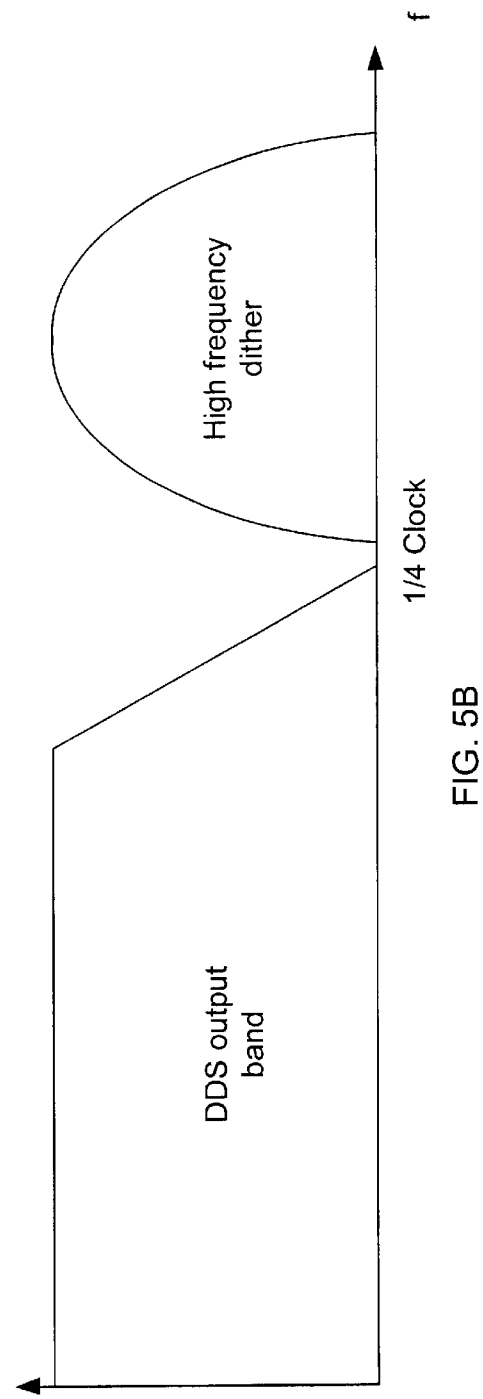

LOW SPURIOUS DIRECT DIGITAL SYNTHESIZER

BACKGROUND OF THE INVENTION

The invention relates generally to direct digital synthesizers and in particular to a direct digital synthesizer utilizing band-shaped dither cancellation to reduce spurious signals.

An existing Direct Digital Synthesizer (DDS) is depicted in FIG. 1. As shown in FIG. 1, the DDS includes a phase accumulator 10 that receives an input corresponding to a change in phase, $\Delta\theta$. The phase accumulator maintains a running total of the phase. The current phase is output to a phase-to-amplitude converter 14 that generates an amplitude value based on the current phase. The phase-to-amplitude converter generates a representation of a sine wave amplitude based on the phase. This may be performed using a look-up table or other known techniques. Lastly, a digital-to-analog converter (DAC) 16 converts the digital amplitude values to an analog signal to generate a sine wave.

The DDS of FIG. 1 suffers from a high level of noise in the output signal, often referred to as spurious signals or spurs. These spurs may be caused by numerical truncation errors and DAC errors. The spurious signal spectrum can change dramatically with slight changes in the input making filtering difficult.

Different approaches have been implemented to address the spurious signals generated by the basic DDS of FIG. 1. Existing DDS devices incorporate frequency, phase or amplitude dither in an attempt to destroy the coherent nature of the DDS spurious sources. These existing dither techniques produce a high level of output noise, are targeted at reducing circuit complexity rather than improving spurious signals, or are of limited effectiveness in reducing DAC generated spurious signals.

Yet another approach involves filtering the output of the DDS using additional RF hardware to reduce spurious signals. Essentially, a DDS is followed by additional RF circuitry (e.g., dividers, PLL's) to "clean up" the output spectrum of the DDS. These techniques require a substantial amount of additional RF hardware, and/or limit the modulation capabilities of the DDS.

BRIEF SUMMARY OF THE INVENTION

An exemplary embodiment of the invention is a direct digital synthesizer for generating an output signal within a frequency band. The direct digital synthesizer comprises an input section for receiving a phase differential value and generating a phase angle value. A phase-amplitude converter generates an amplitude value in response to the phase angle value. A band-shaped dither generator generates a dither value. A first combiner sums the amplitude value and the dither value to define a first combined value. A second combiner differences the amplitude value and the dither value to define a second combined value. A first digital-to-analog converter (DAC) converts the first combined value to a first analog signal. A second digital-to-analog converter (DAC) converts the second combined value to a second analog signal. An output combiner combines the first analog signal and the second analog signal to generate the output signal.

BRIEF DESCRIPTION OF THE DRAWINGS

Referring now to the drawings, wherein like elements are numbered alike in the several FIGURES:

FIGS. 5A and 5B are graphs depicting noise bands and a DDS output signal band;

DETAILED DESCRIPTION

Figure 1:
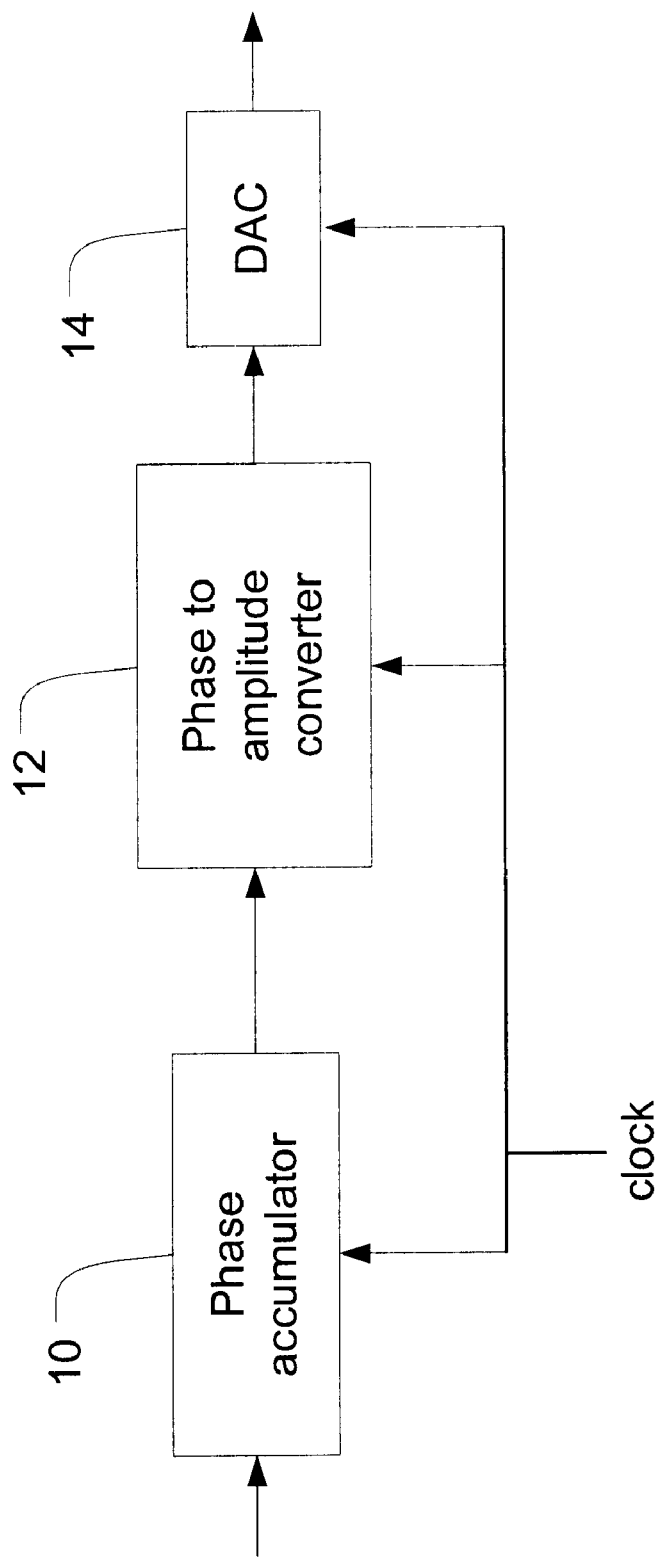
FIG. 1 is a block diagram of a conventional DDS.
Figure 2:
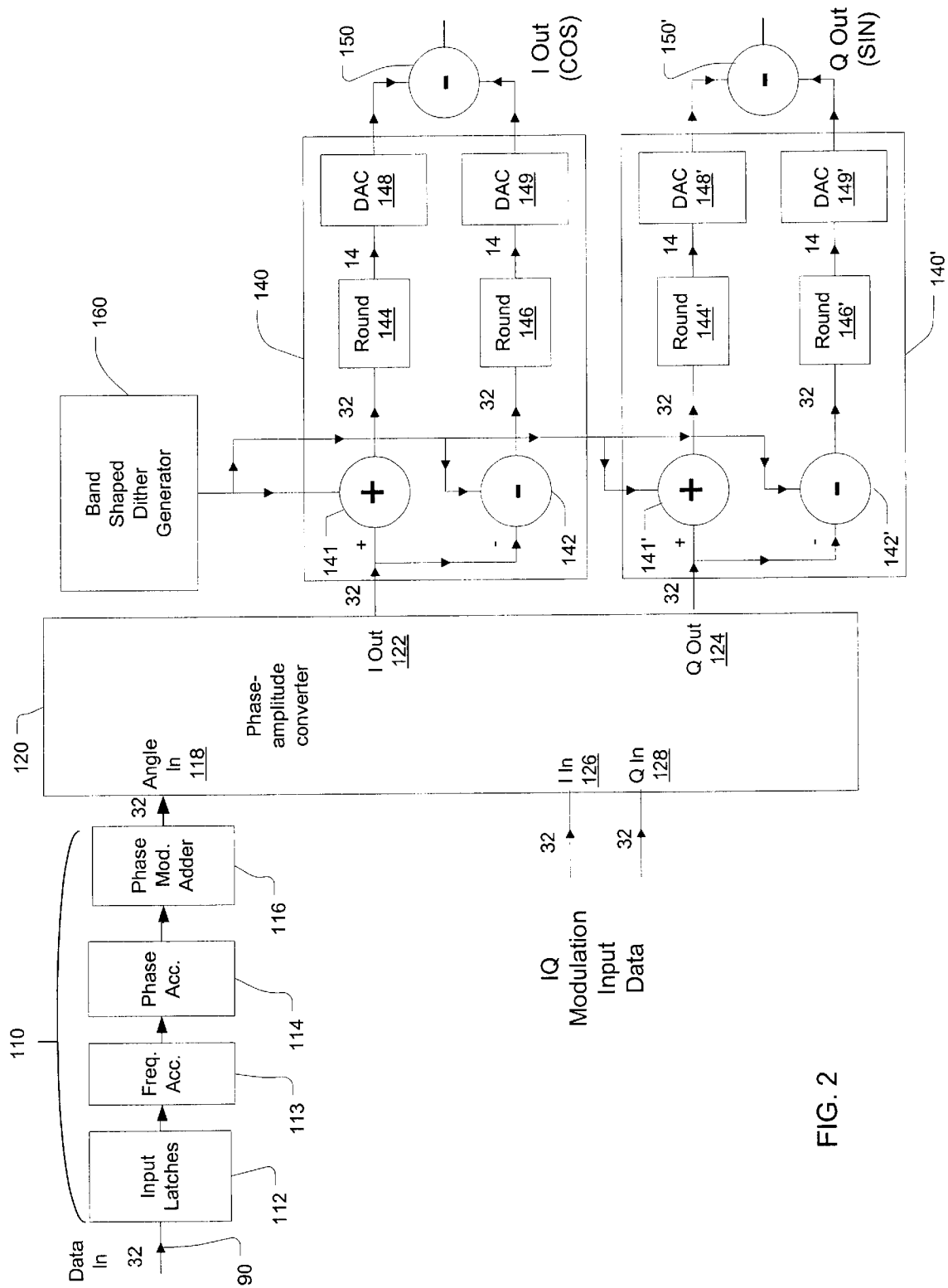
FIG. 2 is a block diagram of a DDS in an exemplary embodiment of the invention.

FIG. 2 is a block diagram of an exemplary DDS 100 in an embodiment of the invention. The DDS 100 may be implemented using hardware, software or a combination of hardware and software. In an exemplary embodiment, the DDS is implemented in an FPGA or ASIC device. In an alternate embodiment, the DDS is implemented by a processor (e.g., a commercially available microprocessor) executing a computer program contained in a storage medium.

The DDS 100 includes an input section 110 receiving a phase differential value 90 represented by N bits. In the example shown in FIG. 2, the phase differential value is represented using 32 bits. The input phase differential may be represented using a higher number of bits (e.g., 48–64) to provide a higher resolution. The phase differential value represents a change in phase or $\Delta\theta$. The phase differential value is applied to a latch 112 that serves as a buffer. A conventional frequency accumulator 113 and a phase accumulator 114 are used to accumulate the input values as is known in the art to provide a present phase value. The output of the phase accumulator 114 is provided to a phase modulation adder 116 which may adjust the accumulated phase with a modulation value to generate a phase angle value 118.

The input section 110 generates a phase angle value 118 having a number of bits M sufficient to reduce the level of the truncation-based spurious signals below the thermal noise floor of the DAC's 148 and 149 described in further detail herein. For example, the phase angle may be represented using at least 28 bits to reduce the level of the truncation-based spurious signals below the thermal noise floor of the DAC's. In the embodiment shown in FIG. 2, the phase angle value is represented with 32 bits.

The phase angle value 118 generated by input section 110 is provided to a phase-amplitude converter 120. The phase-amplitude converter 120 generates at least one amplitude value in response to the input phase angle value 118. In the embodiment shown in FIG. 2, the phase-amplitude converter 120 generates two amplitude values in quadrature, I and Q, where the I amplitude value 122 represents the cosine of the phase angle value 118 and the Q amplitude value 124 represents the sine of the phase angle value 118. The I amplitude value 122 and the Q amplitude value 124 are represented using substantially the same number of M bits as the phase angle value 118. Using the same number of bits eliminates spurious signals caused by amplitude calculation errors or quantization to a small number of bits.

The I and Q amplitude values may be used to modulate in-phase input data 126 (I In) and quadrature input data 128

(Q In). The input data 126 and 128 are preferably represented using the same number of bits as the I amplitude value and the Q amplitude value.

In an exemplary embodiment, the phase-amplitude converter 120 is implemented using a Coordinate Rotation Digital Computer (CORDIC) vector rotator. CORDIC algorithms are known in the art and described in the 1998 ACM publication "A survey of CORDIC algorithms for FPGA based computers" by Ray Andraka, the entire contents of which are incorporated herein by reference. A CORDIC vector rotator can simultaneously determine the sine and cosine value for the input phase angle value 118. In addition, the CORDIC vector rotator also performs rotation of the I and Q input values 122 and 124. With other techniques, such as a lookup table, a complex multiplier is needed to perform this operation.

Figure 3:
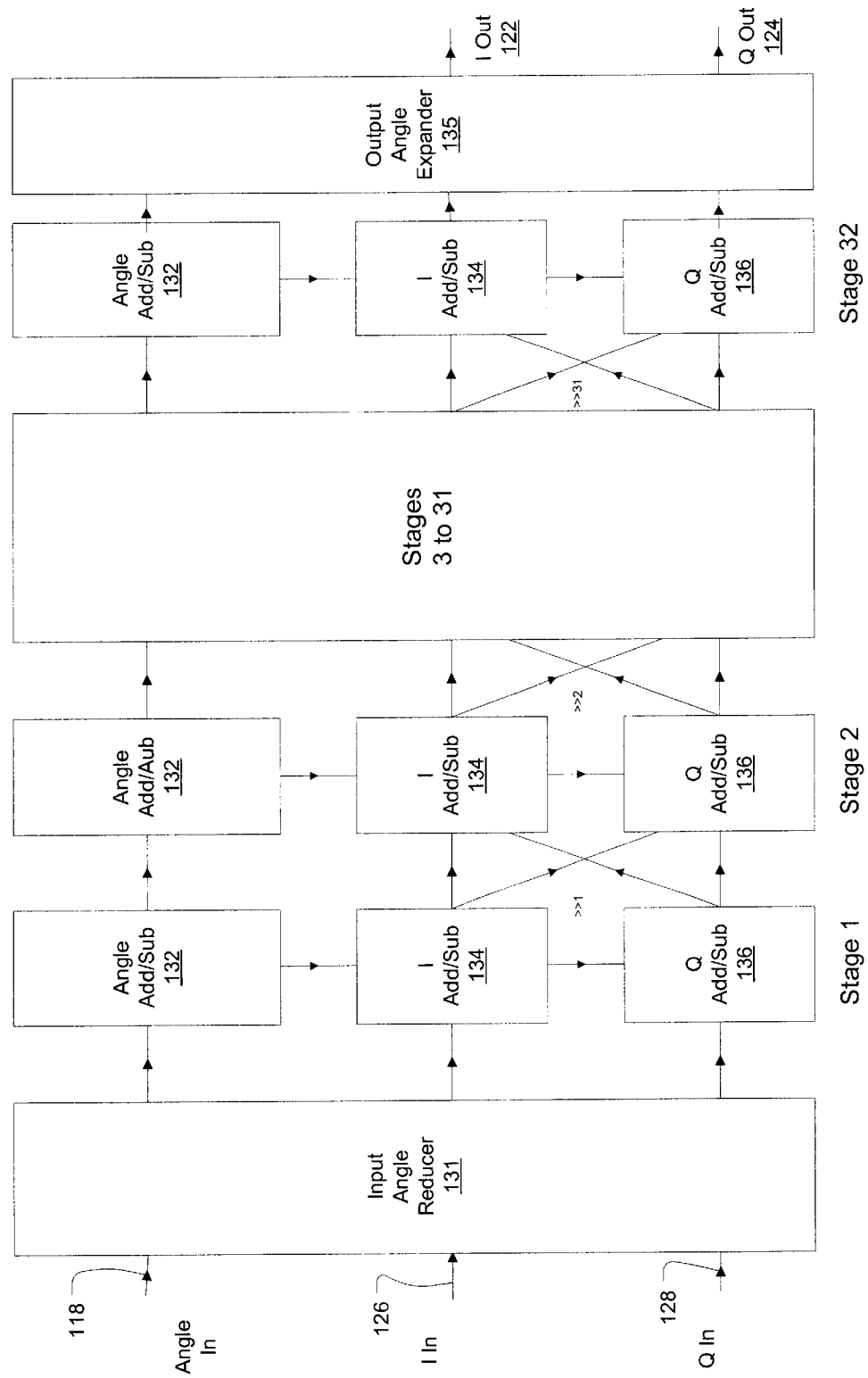
FIG. 3 is a block diagram of a phase-to-amplitude converter in an exemplary embodiment of the invention.

FIG. 3 is a block diagram of an exemplary CORDIC vector rotator having 32 stages. The phase angle value 118 and the I and Q input data 126 and 128 are input to an input angle reducer 131. The CORDIC algorithm utilized has a limited input angle convergence range. Thus, the input angle reducer 131 reduces the input angle to a 0 to 45 degree input range. The result of the CORDIC is then expanded back to full range at output angle expander 135. The angle reduction and expansion are accomplished using the known quadrant symmetry of sin and cos, requiring only negation and muxes in the data path.

The reduced phase angle values are input to a series of angle adder/subtractors 132 and the I and Q input data 126 and 128 are provided to a series of adder/subtractors 134 and 136, respectively. As known in the art, the CORDIC algorithm is an iterative computation in which an X, Y vector is successively rotated through a series of angles that are arctan's of powers of 2. This allows the X, Y vector rotation to be computed using only add/subtracts and shifts, with the angle being compared to a lookup table of successive arctan values. Upon completion of the vector rotation, the results are expanded back to full range at output angle expander 135. The output of the CORDIC vector rotator is the I amplitude value 122 and the Q amplitude value 124.

Use of the CORDIC vector rotator permits the calculation of sinusoidal amplitude values with a precision in phase and amplitude sufficient to effectively eliminate the numerical spurious sources. For example, given that the spur amplitude varies approximately 6 dB/bit, 32 bits of precision in the CORDIC vector rotator places the spur level at −192 dBc, which is below the thermal noise floor of available DAC's and clock sources.

Although the embodiment of FIG. 2 uses CORDIC vector rotation, other high accuracy phase-amplitude conversion techniques are also amenable to implementation in FPGA & ASIC technology. A segmented lookup table may be used to provide the cosine and sine values for the input phase angle value 118. Alternatively, polynomial approximation methods may be used to perform the phase-amplitude conversion.

The I amplitude values 122 and the Q amplitude values 124 are then provided to output sections 140 and 140', respectively. The I amplitude values and Q amplitude values are represented using substantially the same number of bits as phase angle value 118. This eliminates spurious signals that would otherwise be generated by amplitude truncation at the output of the phase-amplitude converter 120. Output sections 140 and 140' operate in a similar manner and include similar components. Thus, only a description of output section 140 is provided.

The I amplitude values 122 are provided to combiners 141 and 142 where dither values from dither generator 160 are combined with the I amplitude values. In an exemplary embodiment, combiner 141 is an adder and combiner 142 is a subtractor. It is understood that alternate schemes may be used. The addition of dither to the I amplitude values reduces harmonic noise and periodic noise generation by DAC's 148 and 149.

Figure 4:
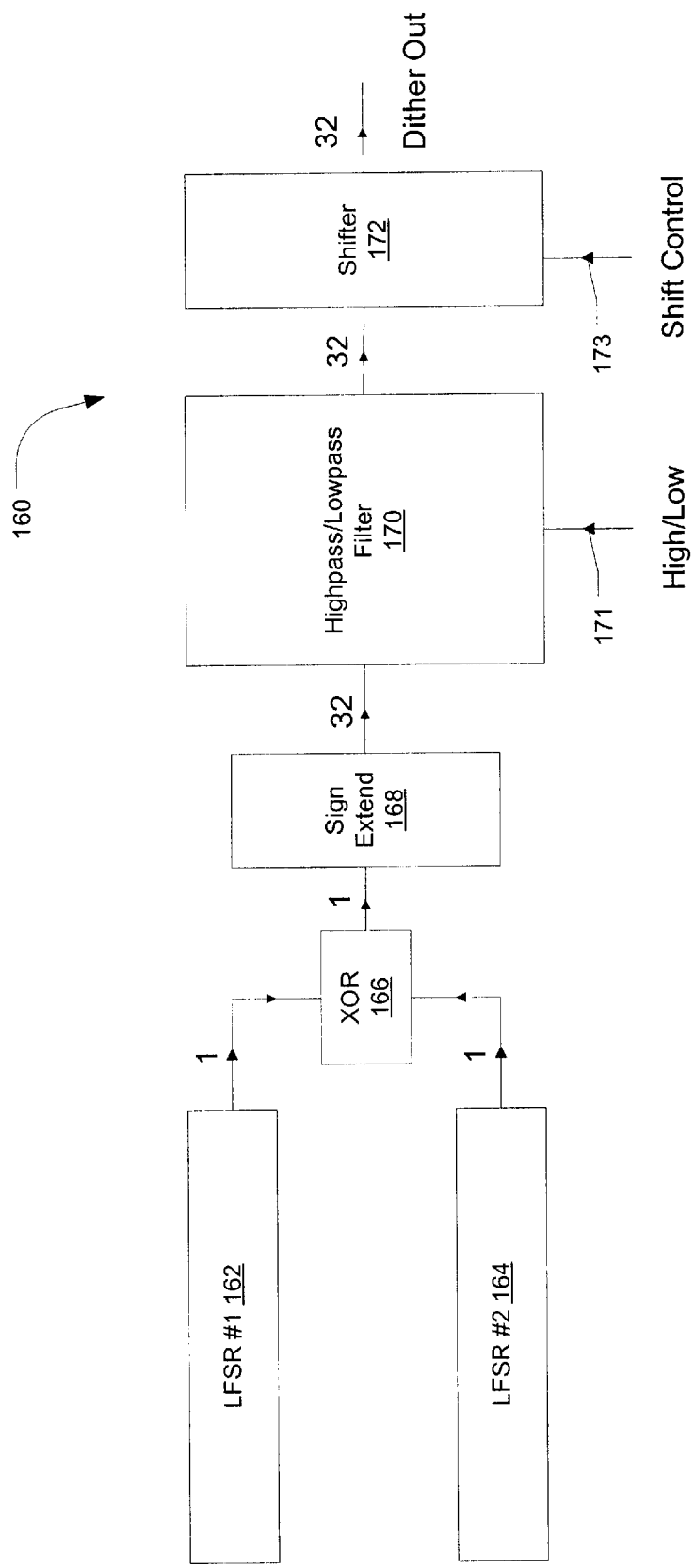
FIG. 4 is a block diagram of a band-shaped dither generator in an exemplary embodiment of the invention.

As shown in FIG. 4, the band-shaped dither generator 160 includes a pair of linear feedback shift registers (LFSR) 162 and 164. Each LFSR generates a pseudorandom sequence of bits which are combined through a Boolean exclusive-OR operation at exclusive-OR gate 166. The single bit output by exclusive-OR gate 166 is provided to sign extender 168. Depending on the state of the exclusive-OR gate output, sign extender 168 outputs either a positive or negative M bit number which matches the bit length of the I amplitude values 122 and the Q amplitude values 124. The magnitude of the dither value may be substantially equal to or greater than the magnitude of the signal represent by the I amplitude values 122 and the Q amplitude values 124. In this manner, the sign extender 168 generates a dither value having a flat frequency spectrum dictated by the output of exclusive-OR gate 166.

The output of register 168 is broadband dither which is then applied to filter 170 to create a narrowband dither signal that lies outside of the desired DDS output bandwidth. Filter 170 may be configured to either a highpass or a lowpass shaped dither passband through a filter control signal 171. The filter control signal 171 is specified by a user and is selected so that the frequency band of the dither does not overlap with the output frequency of the DDS 100, also established by the user.

Filter 170 is comprised of a cascade of identical comb and lowpass/highpass filter sections. The lowpass/highpass sections are implemented by a single tap delay followed by a selectable add/subtract, producing a lowpass or highpass function. The filter stopband may be made arbitrarily low with sufficient filter stages and data path widths. The comb sections are implemented by a two stage delay/summation process, resulting a filter null at ¼ clock frequency.

The resulting filter cascade produces either a highpass or lowpass response with an ultimate filter stopband from DC to ¼ clock frequency for the highpass filter. Typically, the DDS output bandwidth is below ¼ clock frequency as shown in FIG. 5B. More complex filtering may be implemented to create more specific dither passbands. The selected filter topology requires only delay and add/subtract stages, making it simple to implement in FPGA technology.

FIG. 5A illustrates the output band of the DDS relative to the low pass dither band when the filter control signal specifies low pass filtering of the dither. FIG. 5B illustrates the output band of the DDS relative to the high pass dither band when the filter control signal specifies high pass filtering of the dither. As shown in FIGS. 5A and 5B, the low pass dither and high pass dither do not overlap with the desired DDS output bandwidth. As described in further detail herein, this band-shaped dither reduces DAC induced spurious signals while not interfering with the DDS output.

A shifter 172 scales the magnitude of the filtered dither so that the magnitude of the dither does not exceed a desired level. As described herein, the dither is added to the signals output by the phase-amplitude converter 120. The dither is scaled by shifter 172 in response to a shift control signal 173 so that the sum of the dither and the signal does not exceed a predetermined level. The I amplitude values 122 and Q amplitude values 124 are scaled by the user controlling the magnitude of the I input data 126 and Q input data 128, taking into consideration any gain provided by the phase-amplitude converter 120. Controlling the magnitude of the dither from band-shaped dither generator 160 and signals from phase-amplitude converter 120 prevents the summation of these values from exceeding a predetermined limit (e.g., the bit-width of a combiner). In the embodiment shown in FIG. 2, the magnitude of the dither and I amplitude values should be controlled such that an overflow does not occur at combiner 141 resulting in an erroneous value being provided to round-off device 144 and DAC 148.

Referring to FIG. 2, the results of adder 141 and subtractor 142 are provide to round-off devices 144 and 146. At this point, the M bit I amplitude values, modified by the dither values, are rounded down to X bits, where X corresponds to the number of input bits at DAC's 148 and 149. In the embodiment shown in FIG. 2, the 32 bit I amplitude values are rounded to 14 bit values. Again, delaying bit reduction until just prior to the DAC's reduces the occurrence of spurious signals due to truncation.

DAC 148 generates an analog signal corresponding to DITHER+SIGNAL and DAC 149 generates an analog signal corresponding to DITHER−SIGNAL, where SIGNAL represents the sinusoidal signal derived from the I amplitude values 122. The outputs of DAC's 148 and 149 are combined at combiner 150 to form an analog signal (DITHER+SIGNAL)−(DITHER−SIGNAL)=2*SIGNAL.

In the resulting output waveform, the dither has been cancelled, which, when combined with the filtering performed on the dither signal, reduces the in-band contribution of the dither to a negligible amount. Although the dither itself does not contribute directly to the noise floor, the output noise floor does rise due to the randomization of the DAC quantization errors and DAC output nonlinearities.

It is understood that the signs of the SIGNAL and DITHER provided above are exemplary. Output section 140 may generate SIGNAL+DITHER and SIGNAL−DITHER in which case combiner 150 would perform addition. One method of combining the outputs of DAC's 148 and 149 is to simply connect their outputs. An alternate technique is to use a balun to subtract the output signals. This provides additional common mode rejection for clock leakage common to the two DAC's. In this configuration, the signal channels are set to opposite signs, and the dither is added to both channels; the external subtraction then removes the dither. The matching problems generally encountered in such cancellation schemes are mitigated by the use of two identical DAC devices, which are also available as dual DACs on a single IC substrate for even better device matching.

Due to the combined effect of the filtering the dither and cancellation through subtraction, the dither amplitude can also be increased to a much larger level would otherwise be practical. This causes the DAC nonlinearities to be substantially mitigated. In conventional dither introduction techniques, the applied dither is typically at the ½ LSB level of magnitude. By contrast, in an embodiment of the present invention, the dither can be increased such that the dither amplitude is equal to or larger than the signal amplitude generated by phase-amplitude converter 120. A filter may be used after combiner 150 to reject the passband of filter 170 to avoid an increase in the noise floor at large frequency offsets.

Figure 6:
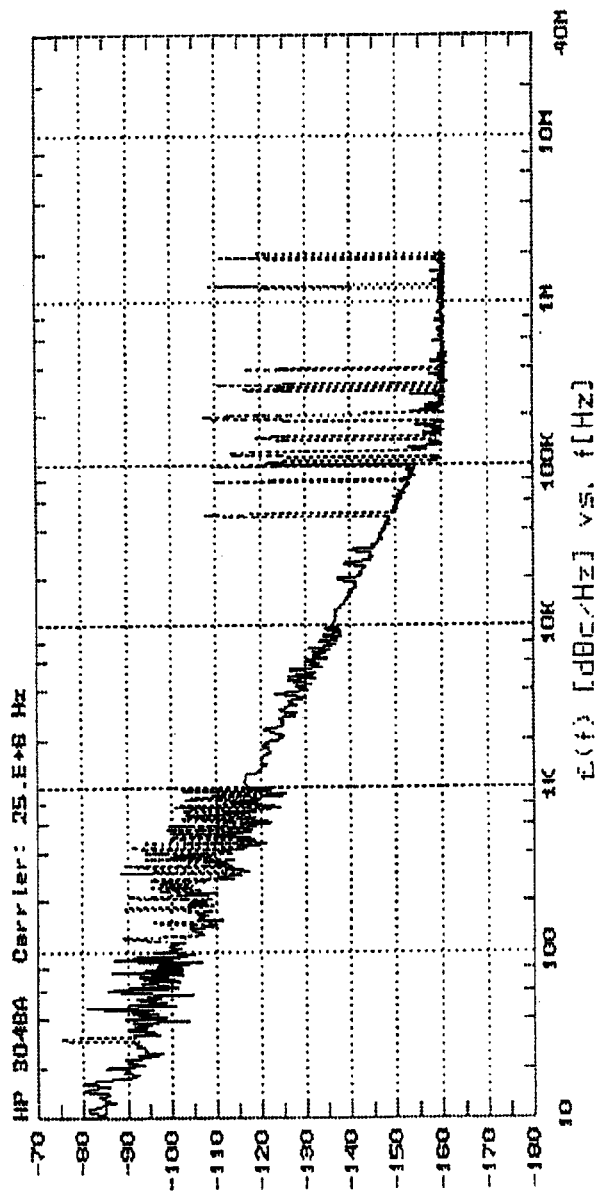
FIG. 6 is a plot of phase noise for a conventional DDS.
Figure 7:
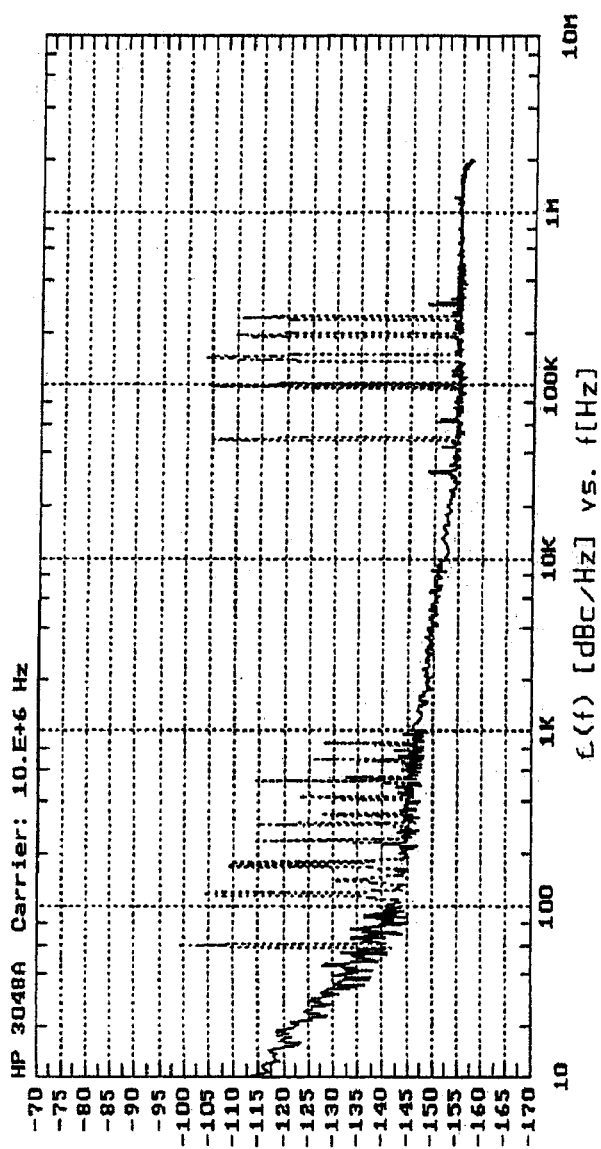
FIG. 7 is a plot of phase noise for a DDS in an embodiment of the invention.

FIGS. 6–9 illustrate the reduction of spurious signals provided by an embodiment of the invention. FIG. 6 depicts phase noise for a conventional DDS and FIG. 7 depicts phase noise for an exemplary embodiment of the invention. At low frequencies, the phase noise in FIG. 7 is lower than that of FIG. 6. In addition, the phase noise in FIG. 7 more rapidly approaches a low level than the phase noise in FIG. 6.

Figure 8:
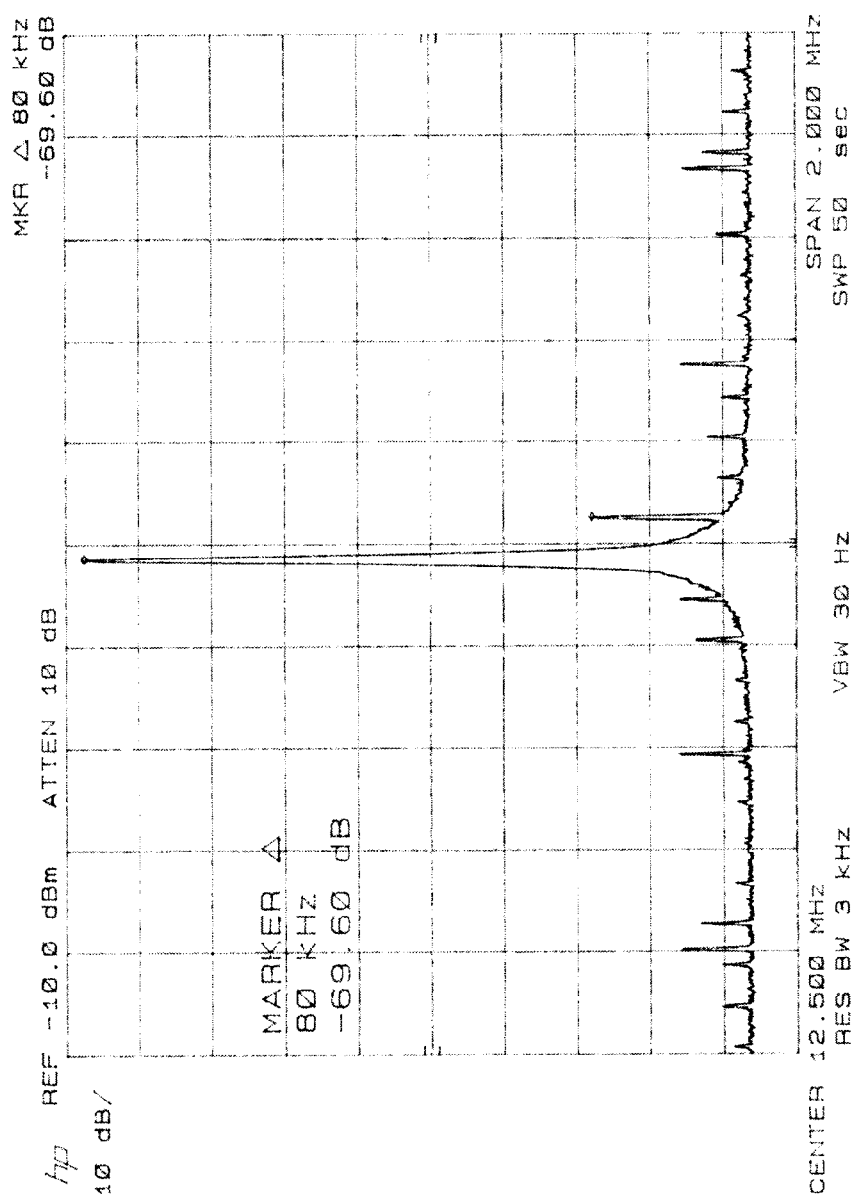
FIG. 8 is a plot of an output signal for a conventional DDS.
Figure 9:
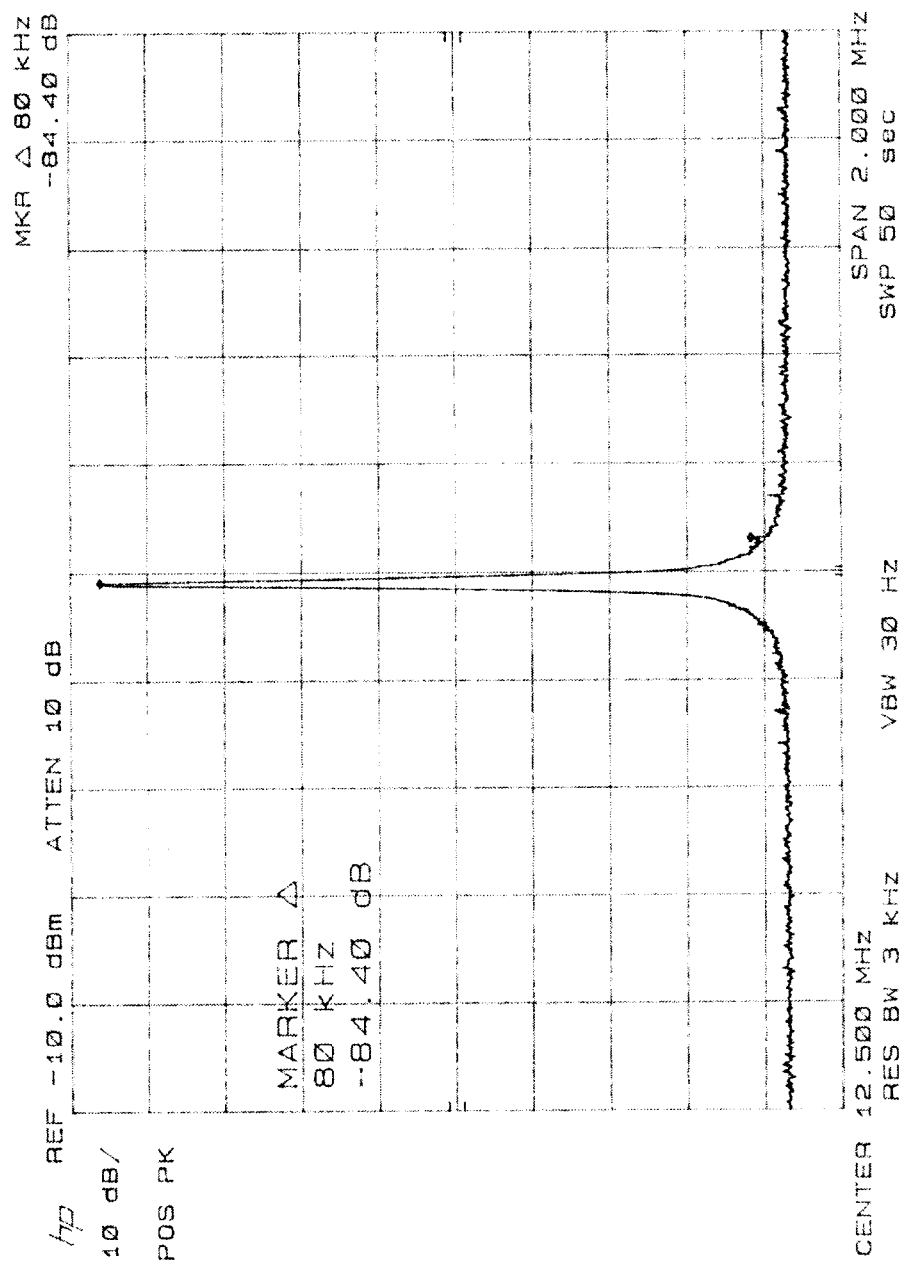
FIG. 9 is a plot of an output signal for a DDS in an embodiment of the invention.

FIG. 8 depicts DDS output for a conventional DDS and FIG. 9 depicts DDS output for an exemplary embodiment of the invention. The conventional DDS output of FIG. 8 includes numerous spurs distributed across the frequency spectrum. By contrast, the DDS output of FIG. 9 has little or no spurs.

While the invention has been described with reference to exemplary embodiments, it will be understood by those skilled in the art that various changes may be made and equivalents may be substituted for elements thereof without departing from the essential scope thereof. Therefore, it is intended that the invention not be limited to the particular embodiments disclosed for carrying out the invention, but that the invention will include all embodiments falling within the scope of the appended claims.

What is claimed is:

1. A direct digital synthesizer for generating an output signal within a frequency band, the direct digital synthesizer comprising:

an input section receiving a phase differential value and generating a phase angle value;

a phase-amplitude converter generating an amplitude value in response to the phase angle value;

a band-shaped dither generator for generating a dither value;

a first combiner summing the amplitude value and the dither value to define a first combined value;

a second combiner differencing the amplitude value and the dither value to define a second combined value;

a first digital-to-analog converter (DAC) for converting the first combined value to a first analog signal;

a second digital-to-analog converter (DAC) for converting the second combined value to a second analog signal; and an output combiner for combining the first analog signal and the second analog signal to generate the output signal.

2. The direct digital synthesizer of claim 1 wherein the phase differential value and phase angle value are represented with the same number of bits.

3. The direct digital synthesizer of claim 1 wherein the phase angle value is represented with a number of bits sufficient to reduce a level of truncation-based spurious signals below the thermal noise floor of said first DAC and said second DAC.

4. The direct digital synthesizer of claim 1 wherein the phase angle value and amplitude value are represented with the same number of bits.

5. The direct digital synthesizer of claim 1 wherein the phase angle value and amplitude value are represented with substantially the same number of bits.

6. The direct digital synthesizer of claim 1 further comprising a first round-off device for reducing the number of bits representing the first combined value.

7. The direct digital synthesizer of claim 1 further comprising a second round-off device for reducing the number of bits representing the second combined value.

8. The direct digital synthesizer of claim 1 wherein said band-shaped dither generator includes a filter for blocking dither values within the output signal frequency band.

9. The direct digital synthesizer of claim 1 wherein said band-shaped dither generator scales a magnitude of the dither value so that the magnitude of the dither value is substantially equal to a magnitude of the amplitude value.

10. The direct digital synthesizer of claim 1 wherein said band-shaped dither generator scales a magnitude of the dither value so that the sum of the magnitude of the dither value and a magnitude of the amplitude value is less than a limit.

11. The direct digital synthesizer of claim 1 wherein said phase-amplitude converter generates an in-phase amplitude value and a quadrature amplitude value in response to the phase angle value.

12. A method for generating an output signal within a frequency band, the method comprising:

receiving a phase differential value and generating a phase angle value;

generating an amplitude value in response to the phase angle value;

generating a dither value;

summing the amplitude value and the dither value to define a first combined value;

differencing the amplitude value and the dither value to define a second combined value;

converting the first combined value to a first analog signal;

converting the second combined value to a second analog signal; and combining the first analog signal and the second analog signal to generate the output signal.

13. The method of claim 12 wherein the phase differential value and phase angle value are represented with the same number of bits.

14. The method of claim 12 wherein the phase angle value is represented with a number of bits sufficient to reduce a level of truncation-based spurious signals.

15. The method of claim 12 wherein the phase angle value and amplitude value are represented with the same number of bits.

16. The method of claim 12 wherein the phase angle value and amplitude value are represented with substantially the same number of bits.

17. The method of claim 12 further comprising reducing the number of bits representing the first combined value.

18. The method of claim 12 further comprising reducing the number of bits representing the second combined value.

19. The method of claim 12 further comprising blocking dither values within the output signal frequency band.

20. The method of claim 12 further comprising scaling a magnitude of the dither value so that the magnitude of the dither value is substantially equal to a magnitude of the amplitude value.

21. The method of claim 12 further comprising scaling a magnitude of the dither value so that the sum of the magnitude of the dither value and a magnitude of the amplitude value is less than a limit.

22. The method of claim 12 wherein said generating an amplitude value generates an in-phase amplitude value and a quadrature amplitude value in response to the phase angle value.

* * * * *